UNITED STATES PATENT OFFICE.

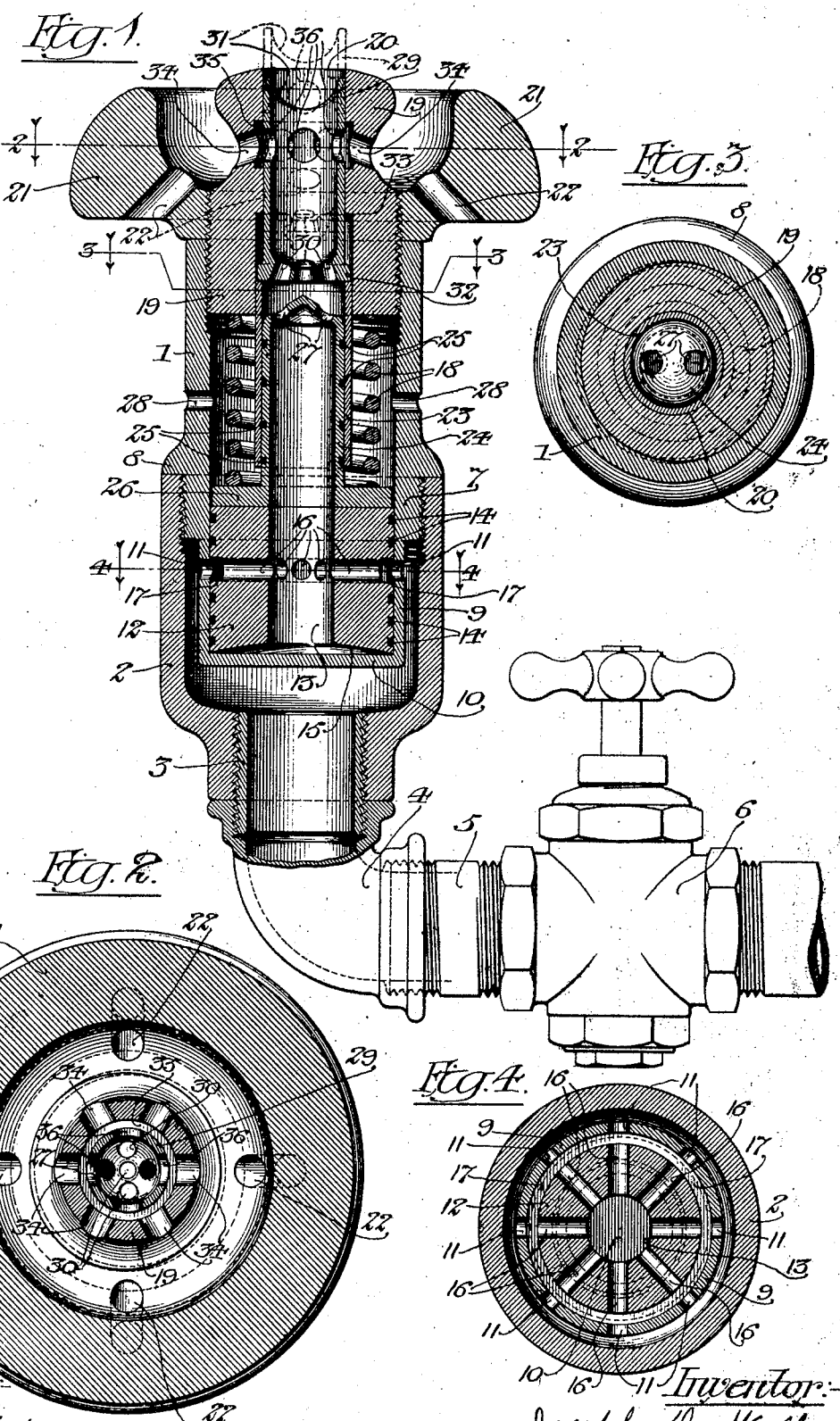

JOSEPH D. WALLACE, OF CHICAGO, ILLINOIS.

PRESSURE-REGULATOR.

1,183,920.  Specification of Letters Patent.  Patented May 23, 1916.

Application filed June 21, 1913. Serial No. 775,001.

*To all whom it may concern:*

Be it known that I, JOSEPH D. WALLACE, a citizen of the United States, and a resident of Chicago, county of Cook, and State of Illinois, have invented certain new and useful Improvements in Pressure - Regulators for Drinking-Fountains and the like, of which the following is declared to be a full, clear, and exact description.

The invention relates to pressure regulators for drinking fountains of that type in which a vertical jet or bubble is emitted from the discharge nozzle thereof.

The invention seeks to provide simple and effective means for regulating the flow of water through the fountain so that the jet or bubble will always be of substantially the same height, irrespective of variations of the pressure of the water in the supply pipe.

The invention also seeks to provide a construction in which the water passing through the fountain is screened and the sediment so collected that the fountain can be readily cleaned.

A further object of the invention is to provide means for deflecting the water passing through the fountain when the discharge nozzle is stopped up or choked by mischievous persons, and which means is so arranged as to ordinarily prevent wasting the water.

The invention seeks to otherwise improve and simplify the drinking fountain and provide a construction which can be economically manufactured and which will not readily get out of order.

The invention consists in the features of improvement hereinafter set forth, illustrated in the preferred form in the accompanying drawings and more particularly pointed out in the appended claims.

In the drawings, Figure 1 is a vertical section of the preferred embodiment of the present invention. Figs. 2, 3 and 4 are cross-sections on the lines 2—2, 3—3 and 4—4, respectively, of Fig. 1.

In the preferred form of the invention illustrated, the main body of the drinking fountain comprises an upper cylindrical casing 1 and a lower cup-like casing 2. The latter is provided at its lower end with a reduced, internally threaded portion and is adapted to engage the threaded end of a service pipe. In the form shown, the lower cup-like casing is connected by a threaded nipple 3 to an elbow 4 on the end of the service pipe 5. The latter is preferably provided with a cut-off valve 6 which is preferably self closing.

The lower portion of the upper cylindrical casing 1 extends within the lower cup-like casing 2. As shown, the upper casing section is provided with an externally screw threaded portion 7 which engages internal threads in the upper part of the casing 2 and the upper casing is provided with an annular shoulder 8 which is adapted to abut against the upper edge of the lower casing. These two casings form, in effect, two separable sections of a single casing or body portion. The lower portion 9 of the upper casing or section below the screw threaded portion 7 is of reduced diameter, so that it is spaced from the walls of the cup-like portion or casing 2. This lower reduced portion 9 has a closed lower end 10 and its side wall, at some distance above its lower end, is provided with one or more inlet ports 11. Preferably, a circular series of inlet ports is provided, as most clearly shown in Fig. 4.

The inlet ports 11 are controlled by a sliding piston valve 12 arranged within the lower portion 9 of the cylindrical casing 1. This piston valve is provided with a central axial bore 13 and is fitted, in a water tight manner, within the cylindrical casing. To guard against leaking of the water around the piston valve 12, the latter is provided with circumferential water sealing grooves 14. It is also provided with one or more transverse passages 16 leading from its central bore and adapted to communicate with the inlet ports 11. Preferably, as shown, the piston valve is provided with a circular series of passages 16 which open into a large circumferential groove 17 in its outer wall and which, when the piston valve is in its lowermost position, is opposite the inlet ports 11. The lower end face 15 of the piston is cupped or dished so that it will be exposed to the pressure of the water within the central bore of the valve.

The water pressure on the lower face of the piston valve tends to raise it to close the inlet ports 11. The pressure of the water is counteracted or arrested by a coiled spring 18 arranged in the upper portion of the cylindrical casing 1 between the piston and a head 19. The head or plug 19, in the form shown, is adjustably threaded within the upper end of the cylindrical casing 1 and it is provided with a central bore or passage 20 for the discharge of water therethrough. By adjusting the position of the head 19, the pressure exerted by the spring 18 on the piston can be regulated, as desired. Preferably, a lock nut is threaded on the head into engagement with the upper end of the casing 1 to hold the head in adjusted position. This lock nut, in the construction shown, comprises a cup 21 which is provided with an upstanding flange extending about the upper end of the head 19. This cup not only acts as a lock nut to hold the adjusting head 19 in position, but also collects the overflow from the discharge passage 20 of the head. The lower portion of the cup is provided with a series of ports or passages 22 through which the water collected in the cup can escape.

Telescopic tubes or sleeves are fitted one within the other in water tight fashion and extend from the head 19 and the piston valve 12 to prevent the application of the water pressure to the upper side of the piston valve. In the preferred form shown, a sleeve 23 is driven into the enlarged lower end of the bore of the head 19, so that the sleeve is rigidly fixed to the head. A tube or sleeve 24 extends upwardly from the piston valve 12 and telescopes within the sleeve 23. This tube or sleeve is preferably provided with water sealing grooves 25. The tube 24 could, if desired, be fixed to the piston rod, but preferably extends from a circular abutment plate 26 which fits against the upper face of the piston valve. By forming the telescopic tube 24 and piston valve of separate pieces, these sliding parts are less liable to bind.

In the preferred form shown, the tube or sleeve 24 is provided with an upper end wall having two ports or passages 27 therein, which are designed to throttle the flow of water through the fountain and are of such size as to give the desired height of jet or bubble with the minimum amount of pressure. If the pressure increases, the piston will rise and cut down the flow through the inlet ports 11. In this way, the pressure within the valve and the height of the jet or bubble emitted from the fountain is uniformly maintained in spite of variations of pressure in the service pipe. To permit the escape of any water which may leak around the piston or around the telescoping tube 24, the cylindrical casing 1 is provided with apertures 28 which open into the space between the piston valve and the head 19.

The discharge passage of the head 19 is provided with a vertically movable discharge nozzle or jet tube 29. This jet tube has a lower end wall provided with a series of perforations 30, and its upper end is preferably serrated or provided with deep notches 31. The lower end of the tube is also provided with a flange 32 which is arranged between the end of the sleeve 23 and an internal shoulder 33 in the bore of the head 19 to thereby prevent the disengagement of the jet tube from the head. When water is flowing through the fountain, the jet tube or nozzle is held in elevated position (as shown in dotted lines in Fig. 1) with the flange 32 engaging the shoulder 33 and with its upper end projecting above the upper end of the head 19.

In its upper position, the jet tube is designed to close a series of escape ports 34 formed in the side wall of the head 19 and leading from the bore or passage thereof into the cavity of the surrounding cup 21. These passages preferably lead from an annular channel or groove 35 formed in the inner surface of the hollow head 19.

The jet tube is preferably adapted to be held in uppermost position and close the ports 34 by the momentum of water passing through the fountain. If any one tries to deflect or squirt the water passing from the fountain by placing his finger on the discharge nozzle or jet tube 22, the latter will be readily depressed and will bring a series of ports or openings 36 therein opposite the passages 35 and 34, so that the pressure of the water within the passage will be relieved and the water will pass out through these passages. The water of the jet or bubble cannot be deflected or squirted by placing the finger lightly on the upper end of the jet tube without depressing it, since the water will then escape freely through the notches 31 in the upper serrated edge of the jet tube. As stated, the jet tube is preferably arranged to be upheld by the momentum of water passing through the fountain, so that when the water is cut off, the jet tube will fall by gravity to the position shown in full lines in Fig. 1 with the flange 32 at its lower end resting on the upper end of the sleeve 23.

As stated, the throttling apertures 27, between the regulating piston valve and the nozzle, are of such size that sufficient water will pass therethrough to give the desired height of bubble with the pressure of a few pounds in the service pipe. With higher pressures in the supply pipe, the piston is forced upwardly to cut down the flow through the inlet ports 11 and thereby reduce the pressure within the passages leading to the throttling ports 27 to the desired low minimum. It should be noted that the water pressure upon the surfaces of the passages 16 and 17 of the pressure regulating piston valve, is balanced and the shift of the piston is effected slowly by the reduced water pressure against its lower face. By this arrangement, the pressure of the water upon the surfaces of the piston valve closely adjacent the inlet ports 11 and balanced and the unbalanced piston area is exposed only to the reduced pressure at some distance from the inlet ports, no unbalanced portions of the regulating device being exposed directly to the initial pressure in the service pipe. By reason of this arrangement, the pressure regulating valve acts efficiently to maintain the reduced pressure uniform and at the desired low minimum in spite of wide variations in the initial pressure, and even though the initial pressure may be very high.

It is obvious that changes may be made in the details set forth without departure from the essentials of the invention and that parts may be utilized without adopting the construction set forth in entirety.

I claim as my invention:—

1. In a drinking fountain or the like, the combination of a cylindrical casing adapted to be connected to a service pipe and having an inlet port in its side wall, a sliding piston-valve in said casing exposed on one side to the water pressure, said piston-valve extending over said inlet port and having a transverse passage communicating therewith, an adjusting head having a threaded engagement with said casing, a spring interposed between said head and said piston-valve for opposing the pressure of the water thereon, a discharge nozzle communicating with said casing, and a throttling device interposed between said nozzle and said piston valve, substantially as described.

2. In a drinking fountain or the like, the combination with a cylindrical casing closed at one end and having an inlet port in its side wall, a sliding piston-valve in said casing having an axial bore and exposed on one side to the water pressure in said casing, said piston valve extending over said inlet port and having a transverse passage communicating therewith, a head adjustably threaded into the open end of said casing and having a passage for the discharge of water therethrough, a lock-nut threaded on said head, and a spring interposed between said head and said piston valve to oppose the pressure of the water thereon, substantially as described.

3. In a drinking fountain or the like, the combination with a cylindrical casing closed at one end and having an inlet port in its side wall, a sliding piston-valve in said casing having an axial bore and exposed on one side to the water pressure in said casing, said piston valve extending over said inlet port and having a transverse passage communicating therewith, a head in threaded engagement with the open end of said casing and having a passage for the discharge of water therethrough, a coiled spring interposed between said head and said piston-valve, and axial telescoping sleeves extending from said head and said piston-valve, substantially as described.

4. In a drinking fountain or the like, the combination with a cylindrical casing closed at one end and having an inlet port in its side wall, a sliding piston-valve in said casing having an axial bore and exposed on one side to the water pressure in said casing, said piston valve extending over said inlet port and having a transverse passage communicating therewith, a head in threaded engagement with the open end of said casing and having a passage for the discharge of water therethrough and axial telescoping sleeves, one of said sleeves having an end wall provided with throttling apertures, substantially as described.

5. In a drinking fountain or the like, the combination with a cylindrical casing closed at one end and having an inlet port in its side wall, a sliding piston-valve in said casing having an axial bore and exposed on one side to the water pressure in said casing, said piston valve extending over said inlet port and having a transverse passage communicating therewith, a head in threaded engagement with the open end of said casing, and having a passage for the discharge of water therethrough and a sleeve extending inwardly therefrom, an abutment plate engaging said piston and having a tube fitting within said sleeve, and a coiled spring interposed between said head and said plate, substantially as described.

6. In a drinking fountain or the like, the combination with a cylindrical casing closed at one end and having an inlet port in its side wall, a sliding piston-valve in said casing having an axial bore and exposed on one side to the water pressure in said casing, said piston valve extending over said inlet port and having a transverse passage communicating therewith, a head in threaded engagement with the open end of said casing, and having a passage for the discharge of water therethrough and a sleeve extending inwardly therefrom, an abutment plate engaging said piston and having a tube fitting within said sleeve, and a coiled spring interposed between said head and said plate, said tube having an end wall provided with throttling apertures, substantially as described.

7. In a drinking fountain or the like, the combination of a lower cup-like casing adapted to be attached to a service pipe, an upper, cylindrical casing threading into said lower casing and having a closed lower end portion spaced from the wall of said lower casing, and provided with a series of inlet ports in its side wall, a sliding piston having an axial bore in said casing and exposed at its lower end to the water pressure therein, said piston extending over said inlet ports and having a transverse passage communicating therewith, a head in threaded engagement with the upper end of said upper casing and having a passage for the discharge of water therethrough and a coiled spring interposed between said head and said piston, substantially as described.

8. In a drinking fountain or the like, the combination of a lower cup-like casing adapted to be attached to a service pipe, an upper, cylindrical casing threading into said lower casing and having a closed lower end portion spaced from the wall of said lower casing, and provided with a series of inlet ports in its side wall, a sliding piston having an axial bore in said casing and exposed at its lower end to the water pressure therein, said piston extending over said inlet ports and having a transverse passage communicating therewith, a head in threaded engagement with the upper end of said upper casing and having a passage for the discharge of water therethrough and a sleeve extending downwardly therefrom, a tube extending upwardly from said piston and fitting within said sleeve, said tube having an end wall provided with throttling apertures, and a coiled spring interposed between said head and said piston, substantially as described.

9. In a drinking fountain or the like, the combination of a lower cup-like casing adapted to be attached to a service pipe, an upper, cylindrical casing threading into said lower casing and having a closed lower end portion spaced from the wall of said lower casing, and provided with a series of inlet ports in its side wall, a sliding piston having an axial bore in said casing and exposed at its lower end to the water pressure therein, said piston extending over said inlet ports and having a transverse passage communicating therewith, a head in threaded engagement with the upper end of said upper casing and having a passage for the discharge of water therethrough and a sleeve extending downwardly therefrom, a plate fitting the upper end of said piston and having a tube fitting within said sleeve and a coiled spring interposed between said head and said plate, substantially as described.

10. A drinking fountain or the like comprising a lower, cup-like casing, an upper, cylindrical casing having a closed lower end portion arranged within and spaced from the wall of said lower casing, and provided with a series of inlet ports, a head in the upper end of said upper casing having a discharge passage, a throttling device in said discharge passage, and a regulating valve in said cylindrical casing for controlling said inlet ports, the latter being relatively small in area and adapted to strain the water passing through the fountain, substantially as described.

11. A drinking fountain or the like comprising a lower, cup-like casing, an upper, cylindrical casing having a closed lower end portion arranged within and spaced from the wall of said lower casing, and provided with a series of inlet ports, a head in the upper end of said upper casing having a discharge passage, a piston-valve in said cylindrical casing having an axial bore and a cupped bottom, said piston extending over said inlet ports and having a transverse passage communicating therewith, a spring opposing the pressure of the water on the bottom of said piston, substantially as described.

12. In a drinking fountain or the like, the combination of a cylindrical casing closed at its lower end and having an inlet port in its side wall, a sliding, spring-held, piston-valve fitted in said casing over said inlet port and having an axial bore and a transverse passage leading from its bore and communicating with said inlet port, the lower end of said piston-valve being exposed to the water pressure, a head in the upper end of said casing and telescoping sleeves having a water tight fit extending respectively from said head and said piston and communicating with the bore of said piston, substantially as described.

JOSEPH D. WALLACE.

Witnesses:
  ELEANOR HAGENOW,
  J. G. ANDERSON.